(12) United States Patent
Brantl et al.

(10) Patent No.: US 10,277,037 B2
(45) Date of Patent: Apr. 30, 2019

(54) POWER DISTRIBUTION SYSTEM

(71) Applicant: HS Elektronik Systeme GmbH, Noerdlingen (DE)

(72) Inventors: Peter Brantl, Noerdlingen (DE); Markus Greither, Noerdlingen (DE)

(73) Assignee: HS ELEKTRONIK SYSTEME GMBH, Noerdlingen (DE)

( * ) Notice: Subject to any disclaimer, the term of this patent is extended or adjusted under 35 U.S.C. 154(b) by 142 days.

(21) Appl. No.: 15/364,344

(22) Filed: Nov. 30, 2016

(65) Prior Publication Data
US 2017/0163044 A1    Jun. 8, 2017

(30) Foreign Application Priority Data
Dec. 4, 2015  (DE) .................. 10 2015 121 183

(51) Int. Cl.
*H02J 4/00*    (2006.01)
*H02J 1/00*    (2006.01)

(52) U.S. Cl.
CPC .................. *H02J 4/00* (2013.01); *H02J 1/00* (2013.01); *B64D 2221/00* (2013.01)

(58) Field of Classification Search
CPC ............................... H02J 4/00; B64D 2221/00
See application file for complete search history.

(56) References Cited

U.S. PATENT DOCUMENTS

| | | | |
|---|---|---|---|
| 5,530,335 A * | 6/1996 | Decker | G05F 1/67 136/293 |
| 7,974,058 B2 * | 7/2011 | Maigret | H01H 89/06 200/51.02 |
| 8,059,378 B2 * | 11/2011 | Liu | H02H 1/04 361/91.3 |
| 8,164,866 B2 * | 4/2012 | Vedula | H02H 7/26 361/18 |
| 8,190,934 B2 | 5/2012 | Tofigh et al. | |
| 8,412,966 B2 * | 4/2013 | Tofigh | H02H 1/0015 361/42 |
| 8,466,706 B2 * | 6/2013 | Ramsey | H02J 13/00 136/244 |
| 8,520,352 B2 * | 8/2013 | Phillips | F04B 49/02 257/355 |

(Continued)

OTHER PUBLICATIONS

D. Izquierdo, et. al., "Modeling Methods for Solid State Power controller (SSPC)," May 20-22, 2009, IEEE Compatibility and Power Electronics, pp. 265-270.*

*Primary Examiner* — Thienvu V Tran
*Assistant Examiner* — Pinping Sun
(74) *Attorney, Agent, or Firm* — Cantor Colburn LLP

(57) ABSTRACT

A power distribution system configured to supply electric power from a power supply to at least one load, includes at least two solid state power controllers connected in parallel, each solid state power controller includes: a solid state switching device having a first terminal (D) connected to the power supply, and a second terminal (S) connected to the load, and is configured to switch between an OFF operation mode in which the second terminal (S) is electrically disconnected from the power supply, and an ON operation mode in which the second terminal (S) is electrically connected to the power supply. The system also includes a load current detection unit configured to detect a load current through the solid state switching device.

15 Claims, 1 Drawing Sheet

(56) References Cited

U.S. PATENT DOCUMENTS

| | | |
|---|---|---|
| 8,547,675 B2 | 10/2013 | Maier |
| 8,704,574 B2 | 4/2014 | Prabhuk et al. |
| 9,130,569 B2 | 9/2015 | Maruyama et al. |
| 2003/0189804 A1* | 10/2003 | Kampmeyer ............ H02H 3/33 361/42 |
| 2004/0051384 A1* | 3/2004 | Jackson ................. H02J 1/108 307/43 |
| 2004/0156154 A1* | 8/2004 | Lazarovich .......... H02H 1/0015 361/42 |
| 2008/0043393 A1* | 2/2008 | Petkov .................. H02H 5/041 361/103 |
| 2013/0262003 A1 | 10/2013 | Simper et al. |
| 2013/0307512 A1 | 11/2013 | Guenther et al. |
| 2014/0167797 A1 | 6/2014 | Aerts |
| 2014/0203639 A1 | 7/2014 | Rozman et al. |
| 2014/0217821 A1* | 8/2014 | Rozman ................... H02J 1/14 307/29 |
| 2014/0285940 A1* | 9/2014 | Greither ................ H02H 3/087 361/115 |
| 2015/0138681 A1 | 5/2015 | Mayes |

\* cited by examiner

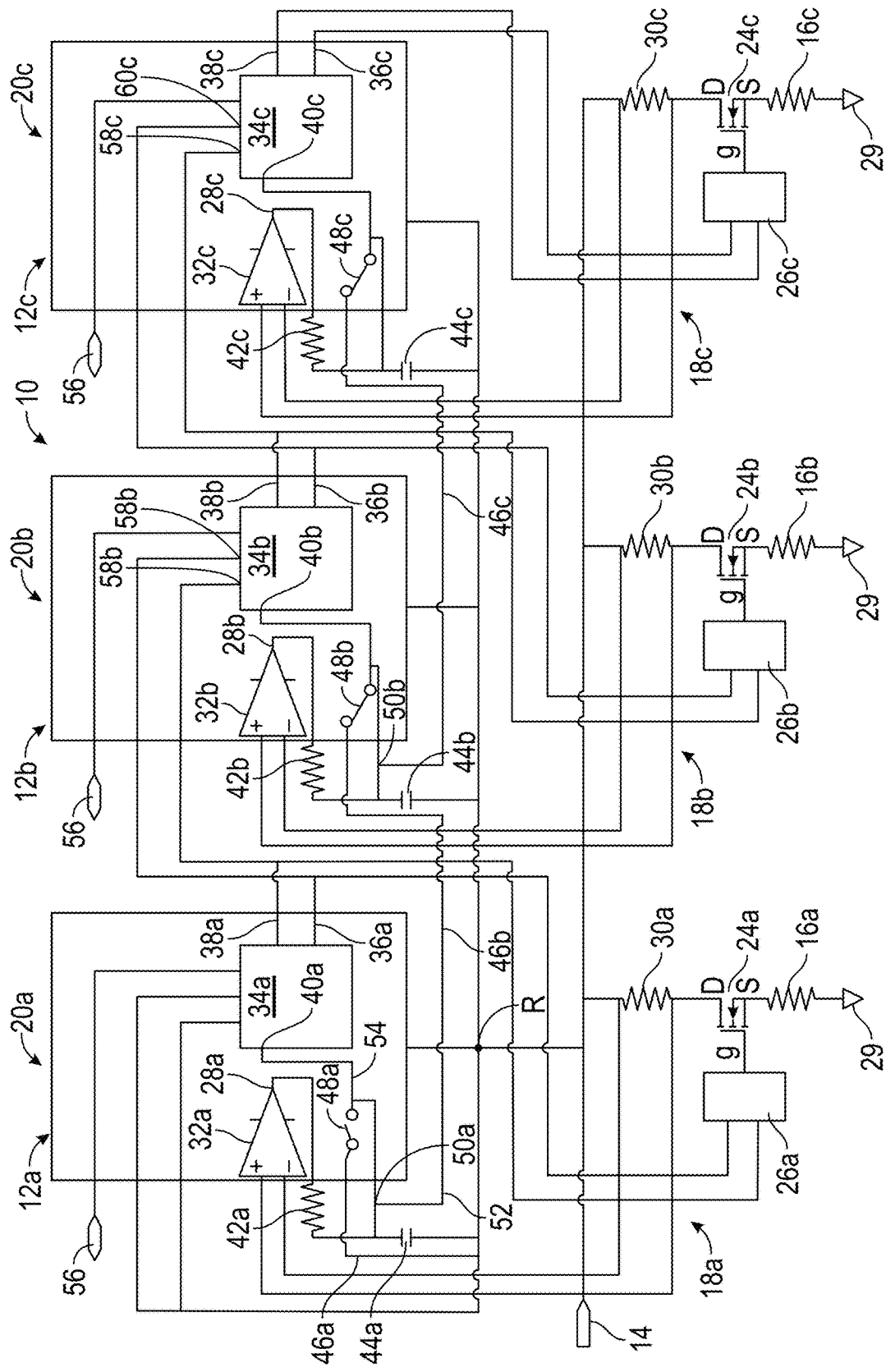

POWER DISTRIBUTION SYSTEM

FOREIGN PRIORITY

This application claims priority to German Patent Application No. 10 2015 121 183.1 filed Dec. 4, 2015, the entire contents of which is incorporated herein by reference.

TECHNICAL FIELD

The present invention relates to a power distribution system using solid state power controllers (in the following referred to as SSPCs).

BACKGROUND

Vehicles, such as aircraft, typically utilize one or more power distribution systems to distribute power from a primary power source to various vehicle systems. An SSPC typically includes at least one electronic switch, such as a field effect transistor (FET), and electronic circuitry that provides wiring protection. The electronic switch and circuitry are usually built in semiconductor technology and therefore referred to as a solid state switching device ("SSSD") and solid state power controller ("SSPC"). SSPC's have found widespread use be-cause of their desirable status capability, reliability, and packaging density. SSPCs are gaining acceptance as a modern alternative to the combination of conventional electromechanical relays and circuit breakers for commercial aircraft power distribution due to their high reliability, "soft" switching characteristics, fast response time, and ability to facilitate advanced load management and other aircraft functions.

In aerospace, electrical power distribution SSPCs are used to switch the voltage from the power sources (e.g. generators or batteries) to the loads. Historically, these SSPCs are designed for a given current rating (e.g. 3A, 5A, 10A . . . ). While SSPCs with current rating under 15 A have been widely utilized in aircraft second-ary distribution systems, power dissipation, voltage drop, and leakage current as-sociated with solid state power switching devices pose challenges for using SSPCs in high voltage applications of aircraft primary distribution systems with higher current ratings.

An approach to provide more flexibility is to allow the paralleling of SSPCs, where the electronic switches contacts are configured such that the SSPCs share the load current. So the SSPCs can be used stand-alone or in parallel dependent on load requirements. This allows achieving larger current ratings using a plurality of SSPCs having a lower current rating connected in parallel.

A typical SSPC generally comprises a power section including at least one solid state switching device which performs the primary power ON/OFF switching, and at least one control section, which is responsible for SSSD ON/OFF control and feeder wire protection. A typical power distribution unit may include hundreds or thousands of SSPCs.

While connecting a number or SSPCs in parallel is a good conceptual approach for flexibility, due to a number of technical reasons implementation has turned to be rather difficult. One problem is that the current sharing between the SSPCs connected in parallel is not perfect. Particularly, each SSPC has a slightly different switch resistance, because of manufacturing tolerances. This results in significant challenges, e.g. when the paralleled SSPCs have to switch off as fast as possible in the event of a short circuit, or when the paralleled SSPCs are switched on in case of a load requiring high inrush current. It is important to switch the SSSDs in each SSPC simultaneously and to avoid tripping of single SSSDs under such circumstances.

It is desirable to have a power distribution system which allows overcoming the above problems.

SUMMARY

Accordingly, embodiments as described herein include: A power distribution system configured to supply electric power from a power supply to at least one load, the power distribution system comprising at least two solid state power controllers (SSPC) connected in parallel. Each solid state power controller (SSPC) comprises a solid state switching device (SSSD) having a first terminal connected to the power supply, and a second terminal connected to the load. The solid state switching device is configured to switch between an OFF operation mode in which the second terminal is electrically disconnected from the power supply, and an ON operation mode in which the second terminal s electrically connected to the power supply. Each of the solid state power controllers also comprises a current detection unit configured to detect a load current through the solid state switching device. The power distribution system is configured to determine a common load current based on the load currents detected by the current detection units of the at least two solid state power controllers connected in parallel and to control operation of the solid state switching devices of the at least two solid state power controller connected in parallel according to the common load current.

In particular, the power distribution system and the solid state power controller module may be configured for managing and distributing electric power in an aircraft. Embodiments also provide an aircraft comprising the power distribution system.

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

BRIEF DESCRIPTION OF THE DRAWINGS

FIG. 1 is a simplified circuit diagram of an SSPC application in a power distribution system using paralleled SSPCs, according to an embodiment of the present invention.

DETAILED DESCRIPTION

FIG. 1 shows a schematic of an SSPC application in a power distribution system 10 using three SSPCs 12a, 12b, 12c connected in parallel. It is to be understood that the number of SSPCs connected parallel is not limited to three, but may be any number as desired to achieve a desired current rating. The electrical power distribution system 10 distributes power (DC power or AC power) from an electrical power supply (schematically indicated as a power supply bus 14) to a load. In FIG. 1 three loads 16a, 16b, 16c are indicated schematically. It is to be understood that the loads 16a, 16b, 16c may be one load common to each of the paralleled SSPCs. Moreover, although the loads 16a, 16b, 16c are indicated to be resistive loads, the loads 16a, 16b, 16c may have any characteristics, like resistive, capacitive, and/or inductive characteristics. Each SSPC 12a, 12b, 12c includes a power section 18a, 18b, 18c, and a sense and control section 20a, 20b, 20c. The power sections 18a, 18b, 18c provide for actually switching between an ON operation mode in which the supply voltage provided by power supply 14 is electrically connected to the respective load 16a, 16b, 16c, and an OFF operation mode in which the supply voltage provided by power supply 14 is disconnected from the respective load 16a, 16b, 16c. The power section comprises a solid state switching device SSSD 24a, 24b, 24c. Further, each SSPC 12a, 12b, 12c includes a sense and control section section 20a, 20b, 20c for controlling ON/OFF operation modes of the respective SSSD 24a, 24b, 24c. FIG. 1 schematically shows the power sections 18a, 18b, 18c and the sense and control sections 20a, 20b, 20c of the SSPCs 12a, 12b, 12c, as far as relevant to the present invention. Other parts of the SSPCs 12a, 12b, 12c are not shown for sake of clarity.

The SSSD may be based on any known semiconductor technology used for production of power switching devices. In one example, SSSDs 24a, 24b, 24c may have the configuration of field effect transistors. A particular embodiment of a field effect transistor is a Si-MOSFET (metal oxide semiconductor field effect transistor). The Si-MOSFET transistor may be made in NMOS technology. Other configurations are conceivable for the SSSD switching devices 24a, 24b, 24c as well, particularly any other kind of switching devices or transistors based on Si technology. Moreover, the SSSDs 24a 24b, 24c may be any kind of bipolar transistor (e.g. a JFET) or unipolar transistor (e.g. a FET or an IGBT). The paralleled power distribution design suggested herein may be beneficial for power distribution systems based on other types of SSSD's as well, particularly for SiC based switching devices or transistors like SiC-MOSFET's or SiC-IGBT's. SiC FET's have turned out to be particularly sensitive with respect to thermal loads induced by temperatures increasing above a nominal temperature.

Each of the SSSDs 24a, 24b, 24c includes a first terminal (in the MOSFETs of FIG. 1: drain D), a second terminal (in the MOSFETs of FIG. 1: source S), and a control terminal (in the MOSFETs of FIG. 1: gate G). Depending on a control voltage applied to control terminal (gate G), an electrical path between the first terminal (drain D) and the second terminal (source S)—in the following referred to as "source-drain path"—will be open (ON condition), or closed (OFF condition). When the source-drain path of the SSSD 24a, 24b, 24c is in the ON condition, usually the source-drain path will be fully open (e.g. the electrical resistance of the source-drain path will be at a minimum), and the SSSD 24a, 24b, 24c operates in the ON operation mode. When the source-drain path of the SSSD 24a, 24b, 24c is in the OFF condition, the source-drain path will be closed (e.g. the electrical resistance of the source-drain path will be very large, or even infinity) and the SSSD 24a, 24b, 24c v operates in the OFF operation mode. The first terminal (drain D) of the SSSD 24a, 24b, 24c is connected to line input as provided by power supply 14, and therefore has the electric potential of the power supply. The power supply may be any kind of DC power supply or AC power supply. A 28V DC power supply is exemplary shown in FIG. 1. It is to be understood that power supply 14 may be any other kind of DC power supply (e.g. 270 V DC) or any kind of an AC power supply, e.g. a 115V/400 Hz AC power supply. The second terminal (source S) of the SSSD 24a, 24b, 24c is connected to load 16a, 16b, 16c.

The control terminal (gate G) of each SSSD 24a, 24b, 24c is connected to a respective gate drive 26a, 26b, 26c of the SSPC 12a, 12b, 12c. The gate drive 26a, 26b, 26c is configured to control an electrical potential of the gate G of the respective SSSD 24a, 24b, 24c. Depending on the electric potential of gate G, the source-drain path of SSSD 24a, 24b, 24c will be conductive, thereby electrically connecting the first terminal (drain D) with the second terminal (source S) of SSSD 24a, 24b, 24c ("ON" operation mode of the SSSD), or non-conductive, thereby isolating the first terminal (drain D) from the second terminal (source S) of SSSD 24a, 24b, 24c ("OFF" operation mode of the SSSD). In the OFF operation mode of the SSSD 24a, 24b, 24c, the second terminal (source S) will be at ground potential (as indicated by 29 in FIG. 1). SSSD 24a, 24b, 24c is configured to switch between ON operation mode and OFF operation mode based on commands supplied to the gate drives 26a, 26b, 26c by the control section 20a, 20b, 20c of the SSPC 12a, 12b, 12c as described in further detail below.

Depending on the electric potential of the gate G, SSSD 24a, 24b, 24c may operate in a transient condition in which the source-drain path of the SSSD 24a, 24b, 24c will be conductive, but have an electrical resistance larger than the minimum possible electrical resistance of the source-drain path in a condition where the electrical potential of the gate G is sufficient to set SSSD 24a, 24b, 24c in the ON operation mode. Such transient condition of SSSD 24a, 24b, 24c is used in the OFF operation mode of the SSSD to dissipate a transient current flowing in the load 16a, 16b, 16c after the start of a switching OFF operation of the SSSD 24a, 24b, 24c, e.g. in case of an SSPC 12a, 12b, 12c connected to a load 16a having inductive characteristics.

Each of the SSPCs 12a, 12b, 12c includes a load current detecting unit providing a signal (indicated at 28a, 28b, 28c in FIG. 1, respectively) indicative of the load current provided by the SSSD 24a, 24b, 24c to the respective load 16a, 16b, 16c. In the embodiment shown, each of the load current detecting units is configured to detect a voltage across a load current measurement resistor 30a, 30b, 30c connected serially in the load circuit, e.g. in between the power supply 14 and the first terminal D of the respective SSSD 24a, 24b, 24c. In the embodiment shown the load current signal 28a, 28b, 28c is a voltage signal indicative of the load current. The voltage signal is supplied to a load current amplifier 32a, 32b, 32c. The output of the load current amplifier delivers the load current signal 28a, 28b, 28c. Other load current detecting arrangements might be used in further embodiments.

The sense and control section 20a, 20b, 20c of each SSPC 12a, 12b, 12c particularly includes a logic and control unit 34a, 34b 34c. Each of the logic and control units 34a, 34b 34c is connected to the respective gate drive 26a, 26b, 26c of SSSDs 24a, 24b, 24c and configured to apply control signals 36a, 38a; 36b, 38b; 36c, 38c to the respective gate drive 26a, 26b, 26c. In FIG. 1, two of these control signals are shown, although there may be more control signals. The first control signal 36a, 36b, 36c is a gate control signal configured to control the gate voltage of SSSD 24a, 24b, 24c during normal operation such that the SSSD 24a, 24b, 24b operates in the ON operation mode or in the OFF operation mode. The second control signal 38a; 38b; 38c is a fast off control signal configured to cause an instantaneous trip off of the SSSD 24a, 24b, 24, e.g. in case of a short circuit.

The logic and control unit 34a, 34b, 34c includes a load control input 40a, 40b, 40c. The load current signal 28a, 28b, 28c is input to the logic and control unit 34a, 34b, 34c at load control input 40a, 40b, 40c via a respective load current weighting resistor 42a, 42b, 42c. Therefore, the logic and control unit 34a, 34b, 34c is configured to output the gate control signal 36a, 36b, 36c and the fast off control signal 38a, 38b, 38c according to the load current detected by the load current detection unit.

Optionally, a capacitor, as indicated by 44a, 44b, 44b in FIG. 1, may be provided between the signal path of the load current signal 28a, 28b, 28c and the reference potential R of each of the sense and control sections 20a, 20b, 20c, to filter out high frequencies components which might otherwise disturb the load current signal 28a, 28b, 28c.

Moreover, a respective load current combination path 46a, 46b, 46c is provided in each of the sense and control sections 20b and 20c. The load current combination path 46b, 46c branches from the load current signal path between the load current amplifier 32a, 32b, 32c and the load current input 42a, 42b, 42c and connects the load current signal path of a respective one of the SSPCs 12b and 12c to the load current path of another one of the SSPCs 12a, and 12b. In case of the first SSPC 12a, no load current combination path is provided, but a branch 46a corresponding to the load current combination path connect the load current signal path to reference potential R. SSPC 12a is a master SSPC in the embodiment of FIG. 1, and therefore receives the load current signals from the other SSPCs 12b and 12bc for providing a common load current signal based on all load current signals 28a, 28b, 28c. A load current combination switch 48a, 48b, 48c is connected serially in the load current combining path 46b and 486c, as well as in the current path 46a. In the case of the SSPC 12a (which is the master SSPC), the load current combination switch 48a is open, and therefore the current path 46b is inactive. In the cases of the SSPCs 12b and 12c (which are slave SSPCs), the load current combination switches 48b, 48c are closed. This has the consequence that the load current signal 28c delivered by the load current detection unit of the third SSPC 12c is delivered to the SSPC 12b and combined with the load current signal 28b delivered by the load current detection unit of the second SSPC 12b at a combination knot 50b. Therefore, downstream of the combination knot 50b a first common load current signal 52 derived by the combination of load current signals 28a and 28b is delivered to the first SSPC 12a at combination knot 50a. In the embodiment shown the first common load current signal 52 represents an average of the individual load current signals 28c and 28b detected by the load current detection units of the SSPCs 12b and 12c. In the same way, the first common load current signal 52 is delivered to the SSPC 12a and combined with the load current signal 28a delivered by the load current detection unit of the first SSPC 12a at combination knot 50a. Therefore, downstream of the combination knot 50a a common load current signal 54 derived by the combination of load current signal 28a and first common load current signal 52 is delivered and received by the logic and control unit 34a of first SSPC 12a at input terminal 40a. In the embodiment shown the common load current signal 54 represents an average of the individual load current signal 28c and the first common load current signal 52. The weighting resistors 42a, 42b, and 42c may be adjusted such that the common load current signal 54 received at input terminal 40a of the logic and control unit 34a of the first SSPC 12a represents a true average of the three individual load currents 28a, 28b, 28c detected by the load current units of the individual SSPCs 12a, 12b, 12c. Thereby, the logic and control unit 34a provides its control signals 36a, 38a for operation of the gate drive 26a based on a common load current signal 54, instead of the load current signal 28a detected by the load current detection unit of the first SSPC 12a.

In the configuration shown in FIG. 1, the first SSPC 12a is configured to be a master SSPC, while the second and third SSPCs 12b and 12c are configured to be slave SSPCs. Configuration of each of SSPCs 12a, 12b, 12c as a master SSPC or as a slave SSPC is determined by a command received by the logic and control units 34a, 34b, 34c of each SSPC 12a, 12b, 12c from a higher order control unit of the power distribution system 10. In FIG. 1, the higher order control unit is schematically indicated at 56. As shown in FIG. 1, the logic and control unit 34a of master SSPC 12a delivers its control signals 36a, 38a not only to its gate drive 26a, but in addition also to the logic and control unit 34b of another SSPC 12b, in the embodiment of FIG. 1 to the logic and control unit 34b of its adjacent SSPC 12b. SSPC 12b is a slave SSPC. This configuration has the consequence that slave SSPC 12b outputs its control signal signals 36b and 38b based on the gate control signal 36a and fast off control signal 38a received at inputs 58b and 60b from the logic and control unit 34a of the first SSPC 12a. These control signals will have priority on any control signals created internally by logic and control unit 34b, as consequence of its configuration being a slave SSPC. In the same way, the configuration of the third SSPC 12c being a slave SSPC has the consequence that slave SSPC 12c outputs its control signal signals 36b and 38b based on the gate control signal 36a and fast off control signal 38a received at inputs 58c and 60c from the logic and control unit 34b of the second SSPC 12b. These control signals will have priority on any control signals created internally by logic and control unit 34c, as consequence of its configuration being a slave SSPC.

Thereby, it is ensured that each of the SSPCs 12a, 12b, and 12c operate synchronously. Moreover, operation of the each of the SSPCs 12a, 12b, 12c is based on a load current signal being derived as a common signal from each load currents detected by load current units associated with the individual SSPCs. Analog load current combination of paralleled SSPCs as described herein will allow to trip of each of SSPC 12a, 12b, 12c being connected in paralleled in coordinated way. Hence, in case of switching into a short-circuit, SSPCs 12a, 12b, 12c will always switch simultaneously. Moreover, this configuration will also ensure that in case of high inrush currents switching all SSPCs based on the common load current will avoid tripping of a single SSPC in the paralleled group of SSPCs 12a, 12b, 12c. The control signals 36a, 38a; 36b, 38b; 36c, 38c to the gate drives 26a, 26b, 26c are derived based on a common load current signal. The common load current signal provides a steady state current measurement which may also be useful in the a higher level process in the system. Particularly, the common load signal may provide an average load signal with respect to all SSPCs in the group of SSPCs connected in parallel. The common load signal may be reported to higher level control unit 56, e.g. by the master SSPC 12a. For example, in case the common load current delivered by the master SSPC 12a represents an average load current for each of SSPCs 12a, 12b, 12c, the higher level control unit 56 may calculate an overall current by multiplying the average load current by the number of paralleled SSPCs. For example, such average load current among all of the paralleled SSPCs could be used by the higher level control unit 56 to supervise the standard I2t curve of a single SSPC also for a paralleled group.

Embodiments as descried herein provide for a power distribution system configured to supply electric power from a power supply to at least one load, the power distribution system comprising at least two solid state power controllers (als referred to as "SSPC") connected in parallel. Each solid state power controller comprises a solid state switching device (als referred to as "SSSD") having a first terminal (D) connected to the power supply, and a second terminal (S) connected to the load. The solid state switching device is configured to switch between an OFF operation mode in which the second terminal (S) is electrically disconnected from the power supply, and an ON operation mode in which the second terminal (S) is electrically connected to the power supply. Moreover, the power distribution system comprises a load current detection unit configured to detect a load current through the solid state switching device. The power distribution system is configured to selectively connect the at least one load to the power supply or to disconnect the at least one load circuit from the power supply according to a load current. The power distribution system is configured to determine a common load current based on the load currents detected by the load current detection units of the at least two solid state power controllers connected in parallel and to control operation of the solid state switching devices of the at least two solid state power controller connected in parallel according to the common load current.

The electric path between the first terminal and the second terminal of the semi-conductor switching device is referred to as "source-drain path" of the SSSD throughout this disclosure. This denotation is typically used in connection with field effect transistors, however it be understood that the term "source-drain path" as used herein applies to other types of SSSDs as well (e.g. to bipolar transistors where the terms "emitter" and "collector" are commonly used instead of "source" and "drain").

The solid state switching device may comprise a field effect transistor, particularly a metal oxide semiconductor field effect transistor (MOSFET). For example, the field effect transistor may comprise a Si field effect transistor. With a field effect transistor, the first terminal will be drain, the second terminal will be source, and the control terminal will be gate. Drain may be connected to the supply voltage and source may be connected to the load circuit. A field effect transistor features easy control. Moreover, MOSFETs have a bi-directional conduction characteristic, a re-sistive conduction nature, and a positive temperature coefficient. To increase the current carrying capability and reduce the voltage drop or power dissipation, the SSSD may comprise multiple MOSFETs generally connected in parallel.

The field effect transistor may comprise a Si field effect transistor as a basic solid state component for building up the solid state switching device. Alternatively, the field effect transistor may comprise a SiC field effect transistor as a basic solid state component for building up the solid state switching device. SiC based SSSDs can be operated at elevated temperatures up to 175° C. Junction Temperature and for switching high line input voltages up to 1200 V.

The SSPCs may be used for switching DC loads as well as AC loads. Typical supply voltages may include 115 VAC; 230 VAC; 28 VDC (as shown in FIG. 1); or 270 VDC. Maximum currents in the load circuit to be switched may include 5 A; 10 A; 15 A; and may be as high as 45 A.

The common load current may be an average load current or a summation load current determined from the load currents detected by the load current detection units of the at least two solid state power controllers connected in parallel and to control operation of the solid state switching devices of the at least two solid state power controller connected in parallel according to the average load current.

Further, each of the solid state power controllers connected in parallel may comprise a weighting resistor connected in between an output of the load current detection unit and a knot at which the output signals of the current detection units of the at least two solid state power controllers are combined to form the common load current signal Further, each of the solid state switching devices may have a control terminal (G) and may be configured to switch, according to a drive voltage applied to the control terminal (G), between the OFF operation mode in which the second terminal (S) is electrically disconnected from the power supply, and the ON operation mode in which the second terminal (S) is electrically connected to the power supply.

Further, the load current detection unit may be configured to detect an electrical current from the first terminal (D) to the second terminal (S) of the solid state switching device (SSSD).

Further, the load current detection unit may comprise a current detection resistor connected between the power supply and the first terminal (D) of the solid state switching device (SSSD).

Further, the load current measuring unit may comprises a load current amplifier providing an output signal characteristic of a voltage drop across the load current measurement resistor.

Particularly, each of the solid state power controllers may comprises a load current combining switch and may be configured to communicate, in a closed state of the load current combining switch, the load current detected by the load current detection unit to another solid state power controller.

Further, each of the solid state power controllers may be configured to communicate, at least in an open state of the load current combining switch, the load current detected by the load current detection unit to a logic and control unit of the solid state power controller for controlling operation of the solid state power controller, particularly for controlling the switching of the solid state power controller between the ON operation mode and the OFF operation mode.

In further embodiments, the power distribution system described herein may have a master and slave configuration. For example, one of the at least two solid state power controllers connected in parallel may be configured to be a master solid state power controller and the other solid state power controllers connected in parallel may be configured to be at least one slave solid state power controller. The master solid state power controller may be configured to communicate with the at least one slave solid state power controller for controlling operation of the at least one slave solid state power controller. Particularly, the master solid state power controller may be configured to control the switching of the at least one solid state semiconductor switch of the master power controller between the ON operation mode and the OFF operation mode based on internal logic in the master solid state power controller. Moreover, the master solid state power controller may also be configured to control the switching of the slave solid state semiconductor switch of the at least one slave solid state power controller between the ON operation mode and the OFF operation mode. Moreover, in particular embodiments, the master solid state power controller may communicate with a higher level control unit of the power distribution system with respect to reporting the status of the master solid state power controller and the slave solid state power controllers to the higher level control unit and with respect to receiving control commands for operation the solid state switching devices of the master solid state power controller and the slave solid state power controllers.

The at least one slave power controller may be configured to communicate with the master solid state power controller and/or with at least one other slave solid state power controller for communicating load current detected by its load current detection unit (30a, 32a; 30b, 32b; 30c, 32c). The slave power controllers might be configured to report other status information to a higher level control unit of the power distribution system, or to the master solid state power controller and/or to the at least one other slave solid state power controller. Particularly, the slave solid state power controller may be configured to control the switching of the at least one solid state semiconductor switch of the slave power controller between the ON operation mode and the OFF operation mode, based on control commands received from the master solid state power controller.

As described above, according to particular embodiments described herein load current values output from differential load current amplifiers of each of the SSPCs may may be directly connected at a combination knot to provide a common load current signal downstream of the combination knot. The connecting of the load current signals may be done using analog load current combination switches provided for each of the SPCCs connected in parallel. One of the SSPCs has its load current combination switch in an open configuration, the other SSPCs have their load current combination switches in a closed. Thereby, the load currents detected by the SSPCs with load current combination switches in a closed configuration may be communicated to the SSPC having its load current combination switch in an open configuration, and may be combined to a common load current signal. In a configuration with a master SSPC and slave SSPC, the master SSPC may have its analog load current combination switch not closed, and the slave SSPCs may have their analog load combination switches closed. The load current values output from differential load current amplifiers may be averaged via respective serial weighting resistors. Thereby, the SSPC with an open configuration of the current combination switch gets an analog "averaged current" value as an averaged voltage signal. The SSPC with the open configuration of the current combination switch may control the control signal to the gate drives of all SSPCS and may report the averaged current in translating the voltage value to higher level for further processing via communication interface.

In the power distribution system as described herein the power supply may provides a DC voltage or an AC voltage.

The power distribution system may be configured for managing and distributing electric power in an aircraft. Therefore, embodiments disclosed herein may also relate to an aircraft comprising the power distribution system described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power distribution system configured to supply electric power from a power supply to at least one load, the power distribution system comprising at least two solid state power controllers connected in parallel, each of the at least two solid state power controllers comprising:
a solid state switching device having a first terminal (D) connected to the power supply, and a second terminal (S) connected to the at least one load, the solid state switching device configured to switch between an OFF operation mode in which the second terminal (S) is electrically disconnected from the power supply, and an ON operation mode in which the second terminal (S) is electrically connected to the power supply (14), and
a load current detection unit configured to detect a load current through the solid state switching device;
wherein the power distribution system is configured to determine a common load current based on the load currents detected by the load current detection units of the at least two solid state power controllers connected in parallel and to control operations of the solid state switching devices of the at least two solid state power controllers connected in parallel according to the common load current;
wherein the power distribution system is configured to determine the common load current by analog load current combination of the load currents detected by the load current detection units of the at least two solid state power controllers connected in parallel.

2. The power distribution system according to claim 1, wherein the common load current is an average load current or a summation load current determined from the load currents detected by the load current detection units of the at least two solid state power controllers connected in parallel and to control operations of the solid state switching devices of the at least two solid state power controllers connected in parallel according to the common load current.

3. The power distribution system according to claim 1, wherein the solid state switching device in each of the at least two solid state power controllers has a control terminal (G) and is configured to switch, according to a drive voltage applied to the control terminal (G), between the OFF operation mode in which the second terminal (S) is electrically disconnected from the power supply, and the ON operation mode in which the second terminal (S) is electrically connected to the power supply (14).

4. The power distribution system according to claim 1, wherein the load current detection unit is configured to detect an electrical current flowing from the first terminal (D) to the second terminal (S) of the solid state switching device.

5. The power distribution system according to claim 4, wherein the load current detection unit comprises a load current measurement resistor connected between the power supply and the first terminal (D) of the solid state switching device.

6. The power distribution system according to claim 5, wherein the load current detection unit comprises a load current amplifier providing an output signal characteristic of a voltage drop across the load current measurement resistor.

7. The power distribution system according to claim 1, wherein one of the at least two solid state power controllers connected in parallel is configured to be a master solid state power controller and the other(s) of the at least two solid state power controllers connected in parallel are configured to be at least one slave solid state power controller; the master solid state power controller being configured to communicate with the at least one slave solid state power controller for controlling an operation of the at least one slave solid state power controller.

8. The power distribution system according to claim 7, wherein the at least one slave power controller is configured to communicate with the master solid state power controller and/or with at least one other slave solid state power controller for communicating the load current detected by its load current detection unit to the master solid state power controller and/or to the at least one other slave solid state power controller.

9. The power distribution system according to claim 1, wherein the power supply provides a DC voltage.

10. The power distribution system according to claim 1, wherein the power supply provides an AC voltage.

11. The power distribution system according to claim 1, being configured for managing and distributing the electric power in an aircraft.

12. An aircraft comprising the power distribution system according to claim 11.

13. A power distribution system configured to supply electric power from a power supply to at least one load, the power distribution system comprising at least two solid state power controllers connected in parallel,
each of the at least two solid state power controllers comprising:
a solid state switching device having a first terminal (D) connected to the power supply, and a second terminal (S) connected to the at least one load, the solid state switching device configured to switch between an OFF operation mode in which the second terminal (S) is electrically disconnected from the power supply, and an ON operation mode in which the second terminal (S) is electrically connected to the power supply (14), and
a load current detection unit configured to detect a load current through the solid state switching device;
wherein the power distribution system is configured to determine a common load current based on the load currents detected by the load current detection units of the at least two solid state power controllers connected in parallel and to control operations of the solid state switching devices of the at least two solid state power controllers connected in parallel according to the common load current;
wherein the each of the at least two solid state power controllers connected in parallel comprises a weighting resistor connected between an output of the load current detection unit and a knot at which output signals of the load current detection units of the at least two solid state power controllers are combined to form the common load current.

14. A power distribution system configured to supply electric power from a power supply to at least one load, the power distribution system comprising at least two solid state power controllers connected in parallel,
each of the at least two solid state power controllers comprising:
a solid state switching device having a first terminal (D) connected to the power supply, and a second terminal (S) connected to the at least one load, the solid state switching device configured to switch between an OFF operation mode in which the second terminal (S) is electrically disconnected from the power supply, and an ON operation mode in which the second terminal (S) is electrically connected to the power supply (14), and
a load current detection unit configured to detect a load current through the solid state switching device;
wherein the power distribution system is configured to determine a common load current based on the load currents detected by the load current detection units of the at least two solid state power controllers connected in parallel and to control operations of the solid state switching devices of the at least two solid state power controllers connected in parallel according to the common load current;
wherein the each of the at least two solid state power controllers comprise a load current combining switch configured to communicate, in a closed state of the load current combining switch, the load current detected by the load current detection unit to another solid state power controller.

15. The power distribution system according to claim 14, wherein the each of the at least two solid state power controllers is configured to communicate, at least in an open state of the load current combining switch, the load current detected by the load current detection unit to a sense and control unit of the each of the at least two solid state power controllers for controlling an operation of the each of the at least two solid state power controllers.

* * * * *